(12) United States Patent
Russ et al.

(10) Patent No.: US 10,077,117 B2
(45) Date of Patent: Sep. 18, 2018

(54) RAM AIR TURBINE GEARBOX SEALING

(71) Applicant: HAMILTON SUNDSTRAND CORPORATION, Charlotte, NC (US)

(72) Inventors: David Russ, Rockford, IL (US); Stephen Bortoli, Roscoe, IL (US); Richard Schultz, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 428 days.

(21) Appl. No.: 14/280,588

(22) Filed: May 17, 2014

(65) Prior Publication Data
US 2015/0329214 A1 Nov. 19, 2015

(51) Int. Cl.
B64D 41/00 (2006.01)
F01D 15/12 (2006.01)
F03D 15/10 (2016.01)
F03D 9/00 (2016.01)
F03D 80/70 (2016.01)
F03D 9/32 (2016.01)

(52) U.S. Cl.
CPC .......... *B64D 41/007* (2013.01); *F01D 15/12* (2013.01); *F03D 9/00* (2013.01); *F03D 15/10* (2016.05); *F03D 9/32* (2016.05); *F03D 80/70* (2016.05); *F05B 2220/31* (2013.01); *F05B 2240/50* (2013.01); *F05B 2240/57* (2013.01); *F05D 2210/12* (2013.01); *F05D 2220/10* (2013.01); *F05D 2220/50* (2013.01); *F05D 2240/50* (2013.01); *F05D 2240/55* (2013.01); *Y02E 10/72* (2013.01)

(58) Field of Classification Search
CPC ....... B64D 41/007; Y02E 10/72; F01D 15/12; F05B 2220/31; F05B 2240/50; F05B 2240/57; F03D 9/00; F05D 2210/12; F05D 2220/10; F05D 2220/50; F05D 2240/50; F05D 2240/55; F05D 2220/34
USPC ......... 416/170 R, 174, 244 A; 415/110, 111, 415/112
See application file for complete search history.

(56) References Cited

U.S. PATENT DOCUMENTS 1,411,126 A * 3/1922 Page ................... F01P 5/04
123/41.49
3,633,411 A 1/1972 Hann et al.
(Continued)

OTHER PUBLICATIONS

Extended European Search Report dated Oct. 6, 2015 in European Application No. 15001482.7.

*Primary Examiner* — Kevin Murphy
*Assistant Examiner* — Kelsey Cary
(74) *Attorney, Agent, or Firm* — Snell & Wilmer, L.L.P.

(57) ABSTRACT

A ram air turbine includes a turbine with one or more blades, a strut removably coupled to the turbine and having a gearbox section and a drive section, a cover located at an end of the gearbox section of the strut with a test plug having a static seal, a turbine shaft and a bevel gear located in the gearbox section of the strut and a driveshaft and a pinion gear located in the drive section of the strut, wherein the pinion gear engages with the bevel gear. The turbine shaft may include a dynamic seal that provides sealing between the turbine shaft and the cover. The test plug may be a threaded plug. The cover may also utilize a dynamic seal. The turbine shaft may include a splined internal cavity for use with a ground test motor.

13 Claims, 5 Drawing Sheets

(56) References Cited

U.S. PATENT DOCUMENTS

| | | | | |
|---|---|---|---|---|
| 3,684,397 | A | * | 8/1972 | Elmer .................... F16D 25/082 |
| | | | | 123/41.12 |
| 3,942,387 | A | * | 3/1976 | Stone ...................... B64C 27/12 |
| | | | | 464/177 |
| 5,174,719 | A | | 12/1992 | Walsh et al. |
| 5,558,495 | A | * | 9/1996 | Parker ................... B64D 41/007 |
| | | | | 219/618 |
| 8,210,810 | B2 | * | 7/2012 | Egoshi .................... F03D 1/003 |
| | | | | 416/1 |
| 2003/0108426 | A1 | * | 6/2003 | Eccles ................... B64D 41/007 |
| | | | | 416/170 R |
| 2007/0160460 | A1 | | 7/2007 | Eccles et al. |
| 2008/0279689 | A1 | * | 11/2008 | Sebald .................... B64C 11/06 |
| | | | | 416/147 |
| 2012/0128495 | A1 | * | 5/2012 | Bortoli ................. B64D 41/007 |
| | | | | 416/170 R |
| 2013/0259648 | A1 | | 10/2013 | Russ |

\* cited by examiner

RAM AIR TURBINE GEARBOX SEALING

FIELD

The present disclosure relates to components of ram air turbines, and more particularly, to gearbox covers for use with ram air turbines.

BACKGROUND

Ram air turbines are generally used in aircraft to provide supplemental and/or emergency power to the aircraft by utilizing air flow to rotate a turbine. Ram air turbines may provide either electrical or hydraulic power. Electrical ram air turbines produce electrical power by transferring the rotation of the turbine to a generator. Ram air turbine gearbox sections may be prone to leakage at the gearbox cover or other sealing surfaces. Therefore, improved gearbox sealing may be beneficial.

SUMMARY

A ram air turbine comprises a turbine comprising a blade, a strut removably coupled to the turbine and comprising a gearbox section and a drive section, a cover located at an end of the gearbox section of the strut comprising a test plug having a static seal, a turbine shaft and a bevel gear located in the gearbox section of the strut and a driveshaft and a pinion gear located in the drive section of the strut, wherein the pinion gear engages with the bevel gear. The turbine shaft may comprise a dynamic seal that provides sealing between the turbine shaft and the cover. The test plug may comprise a threaded plug. The cover may comprise a dynamic seal. The turbine shaft may comprise a splined internal cavity for use with a ground test motor.

A cover located at an end of the gearbox section comprising a test plug having a static seal, and a dynamic seal that provides sealing between a turbine shaft and the cover. The test plug may comprise a threaded plug. The cover may comprise a dynamic seal. The turbine shaft may comprise a splined internal cavity for use with a ground test motor.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Figure 1:
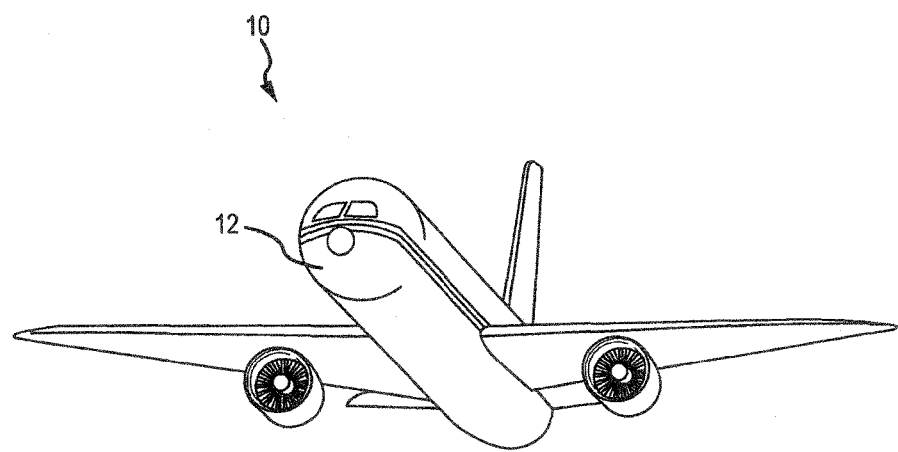
FIG. 1 illustrates a perspective view of an aircraft, in accordance with various embodiments.

In various embodiments and with reference to FIG. 1, an aircraft 10 may comprise a ram air turbine 100. Ram air turbine 100 may be lowered out of aircraft 10 and into the path of airflow to generate electrical power and/or hydraulic power.

Figure 2A:
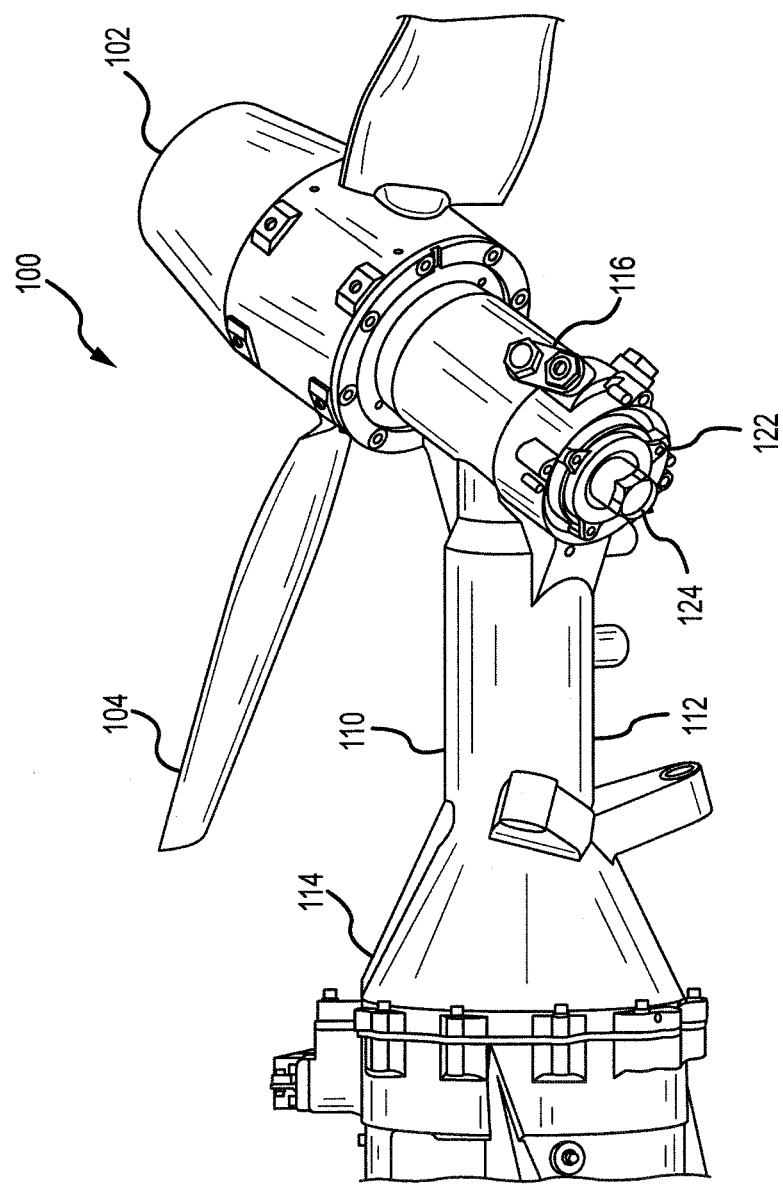
FIGS. 2A-2C illustrate a perspective view, a cross sectional view, and another perspective view of a ram air turbine of an aircraft, in accordance with various embodiments.
Figure 2B:
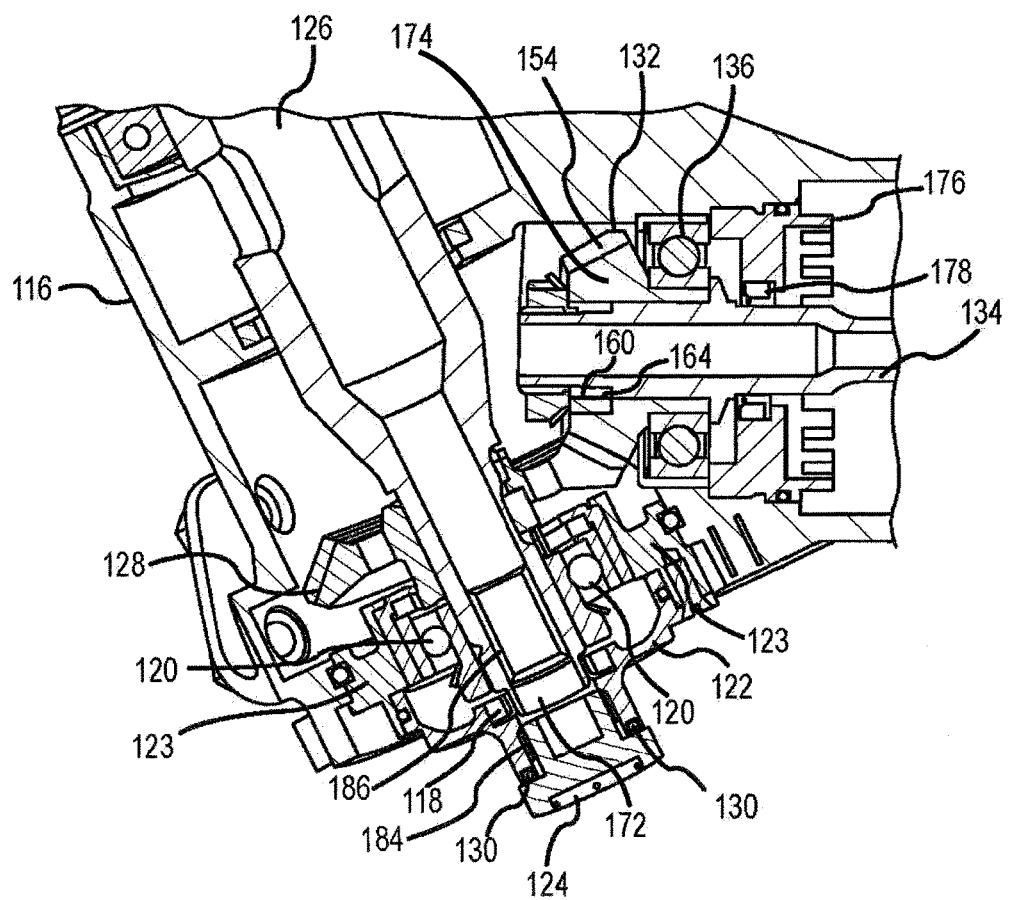
Figure 2C:
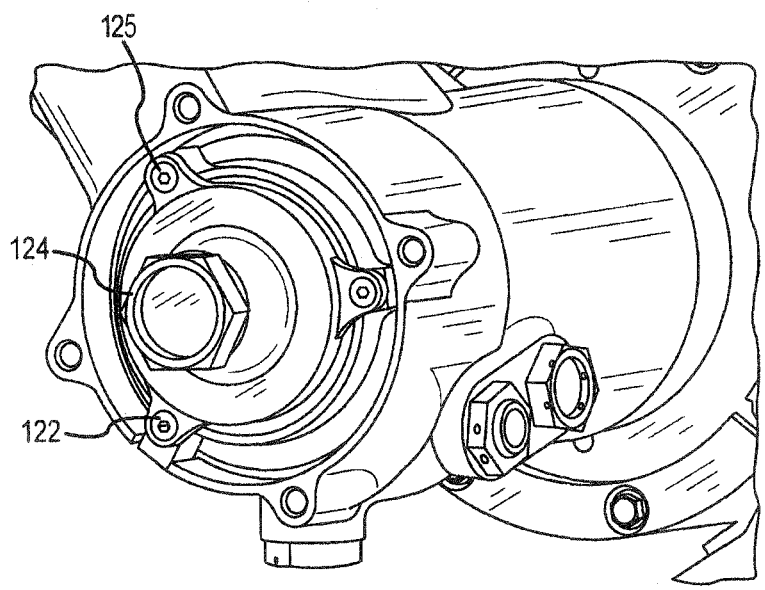

With reference to FIGS. 2A-2C, ram air turbine 100 may comprise, for example a turbine 102 having one or more blades 104. In various embodiments, turbine 102 is removably coupled to a strut 110. For example, strut 110 may be rotably coupled to the rear of turbine 102.

In various embodiments, strut 110 may comprise a gearbox section 116, a drive section 112, and a generator adapter section 114. Strut 110 may be a one piece strut, comprising gearbox section 116, drive section 112, and generator adapter section 114 that are all integral to each other. For example, strut 110 may be machined from a single piece of metal, such as aluminum. In various embodiments, turbine 102 may be removably coupled to gearbox section 116 of strut 110.

As will be further discussed, in various embodiments, the various components of the ram air turbine that transfer rotation of turbine 102 to a generator are located within gearbox section 116, drive section 112, and generator section 114. As will be further described, many of these components may reside in one or more section of strut 110.

In various embodiments, gearbox section 116 comprises a turbine shaft 126 and a bevel gear 128. Turbine shaft 126 may, for example, be removably coupled to turbine 102, allowing turbine shaft 126 to rotate with the rotation of turbine blades 104.

Bevel gear 128 may be removably coupled to turbine shaft 126. For example, bevel gear 128 may be removably coupled to turbine shaft 126 by a spanner nut, a splined connection, or any other manner of coupling. Bevel gear 128 may be oriented perpendicularly to turbine shaft 126. In various embodiments, bevel gear 128 may comprise a beveled profile configured to interface with another gear and transmit rotation of turbine shaft 126 in a different direction. For example, as will be further discussed, bevel gear 128 can interface with a pinion gear to direct the rotational force of turbine 102 to a generator.

In various embodiments, an opposing end of turbine shaft 126 may be seated in a bearing 120 located within a bearing retainer 123. A cover 122 may, for example, be located at an opposite end of gearbox section 116 from turbine 102, and provide a seal for gearbox section 116 against outside contaminants. Further, in various embodiments, gearbox section 116, also referred to as a gearbox section, comprises lubricating fluid, and cover 122 may retain such fluid within gearbox section 116. Cover 122 may, for example, be secured to gearbox section 116 of strut 110 by one or more fasteners 125 such as screws or bolts.

Turbine shaft 126 may, for example, further comprise a dynamic seal 118 positioned at or near cover 122. In various embodiments, dynamic seal 118 may provide the first seal against fluid loss and/or fluid contamination within gearbox section 116.

In various embodiments, cover 122 further comprises a test plug 124. In various embodiments, test plug 124 is threaded and interfaces with a corresponding threaded portion 184 of cover 122. Cover 122 may further comprise a static seal 130 at or near test plug 124. In various embodiments, static seals may be less susceptible to leakage than dynamic seals. Therefore, static seal 130 may perform a more reliable backup sealing function to ensure fluid retention in the gearbox section. In various embodiments, static seal 130 comprises an o-ring. However, static seal 130 may comprise any seal suitable for reducing or preventing fluid loss and/or contamination at the location of test plug 124. In various embodiments, test plug 124 comprises a seal, similar to static seal 130 of cover 122.

Turbine shaft 126 may comprise, for example, a cavity 172. In various embodiments, internal cavity 172 is located at or near test plug 124 of cover 122. For example, with reference to FIG. 3, cavity 172 may comprise splines 186 that are configured to interact with a ground test motor. In such embodiments, test plug 124 may be removed from cover 122 and the ground test motor may be inserted into cavity 172 during a functional ground check of ram air turbine 100.

Figure 3:
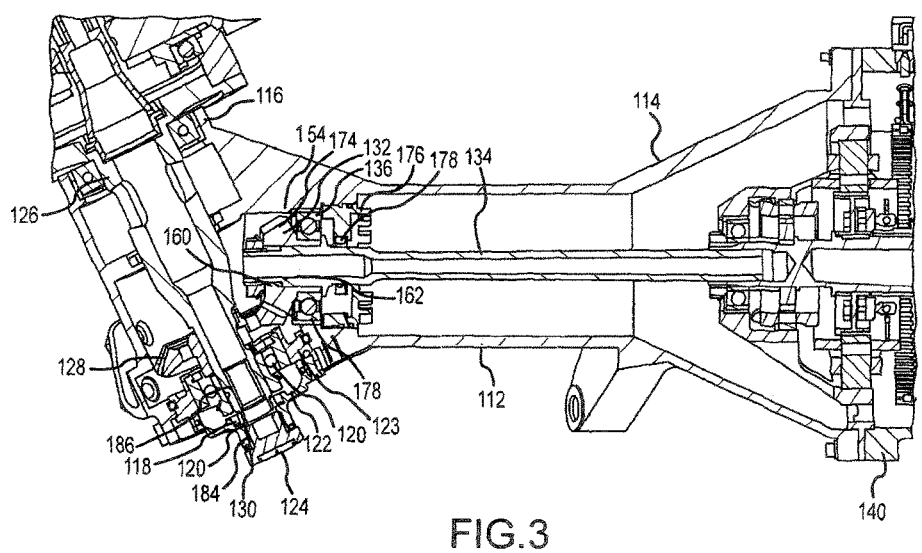
FIG. 3 illustrates a cross sectional view of a ram air turbine of an aircraft, in accordance with various embodiments.

With reference to FIG. 3, in various embodiments, drive section 112 of strut 110 may comprise a driveshaft 134. Driveshaft 134 may traverse drive section 112 and transfer rotation of turbine shaft 126 to generator 140.

In various embodiments, driveshaft 134 comprises a pinion gear 132. With reference to FIG. 3, in various embodiments, pinion gear 132 may comprise a gear body 174 and a gear face 154. Gear face 154 may comprise, for example, a gear tooth pattern that is complimentary to the pattern of bevel gear 128. In various embodiments, pinion gear 132 engages with bevel gear 128 to transfer rotation of turbine shaft 126 to driveshaft 134.

Pinion gear 132 may, for example, be secured to driveshaft 134 by a spanner nut. With reference to FIG. 3, in various embodiments, pinion gear 132 may comprise a key 160 configured to interact with a keyed joint 162 of driveshaft 134. In such embodiments, key 160 and keyed joint 162 may maintain the position of pinion gear 132 such that pinion gear 132 does not rotate independently of driveshaft 134. However, any manner of securing pinion gear 132 to driveshaft 134 is within the scope of the present disclosure.

In various embodiments, driveshaft 134 further comprises a pinion bearing 136. Pinion bearing 136 may be coupled to pinion gear 132 and facilitate rotation and positioning of pinion bearing 136 within drive section 112 of strut 110. For example, pinion bearing 136 may be pressed into gear body 174. However, any manner of coupling pinion gear 132 and pinion bearing 136 is within the scope of the present disclosure.

In various embodiments, upper seal 178 is located within bearing retainer 176 on driveshaft 134. Upper seal 178 may, for example, prevent lubricating fluid transferring from gearbox section 116 to drive section 112 of strut 110. Upper seal 178 may comprise a dynamic seal which rotates as driveshaft 134 and pinion gear 132 rotate. Any suitable seal type and configuration is within the scope of the present disclosure.

Driveshaft 134 may comprise, for example, a hollow shaft with an inner diameter and outer diameter. In further embodiments, driveshaft 134 may comprise a solid shaft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A ram air turbine comprising:
a turbine comprising a blade;

a strut removably coupled to the turbine and comprising a gearbox section and a drive section, wherein the gearbox section is integral to the drive section;

a cover located at an end of the gearbox section of the strut opposite the turbine;

a test plug comprising a threaded portion engaging with a threaded portion of the cover, wherein the cover includes a static seal engaging with the test plug;

a turbine shaft and a bevel gear located in the gearbox section of the strut, wherein the turbine shaft comprises an internal cavity located at an end of the turbine shaft opposite the blade of the turbine, the internal cavity comprising splines, wherein the threaded portion of the test plug is surrounding an axis of rotation of the turbine shaft, and wherein removal of the test plug exposes the splines of the internal cavity;

a bearing and a bearing retainer located proximate the end of the turbine shaft opposite the blade, wherein the end of the turbine shaft opposite the blade is seated in the bearing and the bearing is located within the bearing retainer;

a fastener coupling the cover to the bearing retainer; and a dynamic seal disposed around the end of the turbine shaft opposite the blade of the turbine, wherein the cover is disposed around the axis of rotation of the turbine shaft and proximate the end of the turbine shaft opposite the blade of the turbine, and wherein the dynamic seal is located in an annular space defined, at least partially, by the turbine shaft and the cover, and wherein the dynamic seal is in a sealing engagement with the turbine shaft and the cover.

2. The ram air turbine of claim 1, wherein the fastener extends through a first portion of the cover, the first portion of the cover being generally orthogonal to the axis of rotation of the turbine shaft, and wherein the threaded portion of the cover is located in a second portion of the cover, the second portion of the cover extending generally orthogonally from the first portion of the cover.

3. The ram air turbine of claim 1, wherein in response to the test plug being removed from the cover, the dynamic seal prevents contamination from entering the gearbox section of the strut.

4. The ram air turbine of claim 1, wherein the threaded portion of the test plug is located within the threaded portion of the cover.

5. The ram air turbine of claim 1, wherein the strut comprises aluminum.

6. The ram air turbine of claim 1, further comprising a generator section located at an end of the drive section opposite the gearbox section of the strut.

7. The ram air turbine of claim 6, further comprising a driveshaft and a pinion gear located in the drive section of the strut, wherein the pinion gear engages with the bevel gear.

8. A strut, comprising:

a gearbox section comprising a turbine shaft;

a bearing and a first bearing retainer located proximate an end of the turbine shaft, wherein the end of the turbine shaft is seated in the bearing, and wherein the bearing is located within the first bearing retainer;

a cover coupled to the first bearing retainer, wherein the cover is disposed around an axis of rotation of the turbine shaft;

a fastener coupling the cover to the first bearing retainer;

a test plug removably threaded to the cover, wherein the test plug comprises a threaded portion located within a corresponding threaded portion of the cover, wherein the threaded portion of the test plug and the corresponding threaded portion of the cover surround the axis of rotation of the turbine shaft, and wherein removal of the test plug exposes an internal cavity located in the end of the turbine shaft;

a static seal engaging with the test plug and the cover; and a dynamic seal in a sealing engagement with the cover and the turbine shaft.

9. The strut of claim 8, wherein when the test plug is removed from the cover, the dynamic seal prevents contamination from entering the gearbox section of the strut.

10. The strut of claim 8, wherein the fastener extends through a first portion of the cover, the first portion of the cover being generally orthogonal to the axis of rotation of the turbine shaft, and wherein the threaded portion of the cover is located in a second portion of the cover, the second portion of the cover extending generally orthogonally from the first portion of the cover.

11. The strut of claim 8, further comprising a driveshaft and a pinion gear located in a drive section of the strut, wherein the pinion gear engages with a bevel gear located in the gearbox section of the strut.

12. The strut of claim 11, further comprising:

a second bearing retainer on the driveshaft; and a seal located within the second bearing retainer, wherein the seal is configured to prevent fluid transfer between the gearbox section of the strut and the drive section of the strut.

13. The strut of claim 8, wherein the internal cavity located at the end of the turbine shaft comprises splines.

* * * * *